United States Patent [19]
Satchell, Jr.

[11] Patent Number: 5,938,815
[45] Date of Patent: *Aug. 17, 1999

[54] IRON ORE REFINING METHOD

[75] Inventor: Donald Prentice Satchell, Jr., Summit, N.J.

[73] Assignee: The BOC Company, Inc., New Providence, N.J.

[*] Notice: This patent is subject to a terminal disclaimer.

[21] Appl. No.: 08/816,232

[22] Filed: Mar. 13, 1997

[51] Int. Cl.⁶ .............................. C21B 13/14; C22B 5/14
[52] U.S. Cl. .................................. 75/446; 75/448; 75/500
[58] Field of Search ............................. 75/446, 448, 500

[56] References Cited

U.S. PATENT DOCUMENTS 3,028,231  12/1962  Klemantaski et al. .
5,613,997   3/1997  Satchell, Jr. ................................ 75/446

*Primary Examiner*—Melvyn Andrews
*Attorney, Agent, or Firm*—David M. Rosenblum; Salvatore P. Pace

[57] ABSTRACT

An iron ore refining method in which a secondary reactor is employed for partly reducing iron ore and partly oxidizing a carbon containing substance to form partly reduced secondary iron ore, the coal char and a calorific containing carbon dioxide and carbon monoxide in a ratio of no less than about 0.25. The calorific gas is separated from the partly reduced secondary iron ore and the coal char and the resulting heated solids are introduced into the primary reactor without substantial cooling. All or part of the iron product is formed from the partly reduced iron ore produced in the primary reactor. Since the secondary reactor operates at a lower temperature than the primary reactor, part of the iron product is processed at a lower temperature to reduce oxygen requirements for the refining and to increase thermal efficiency.

10 Claims, 1 Drawing Sheet

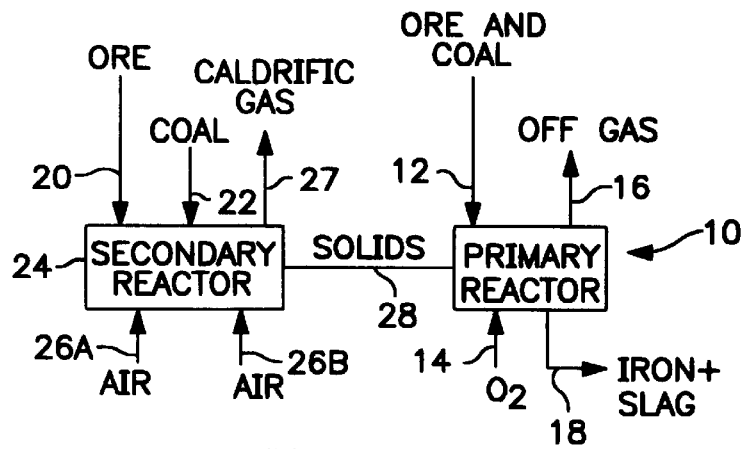
FIG. 1
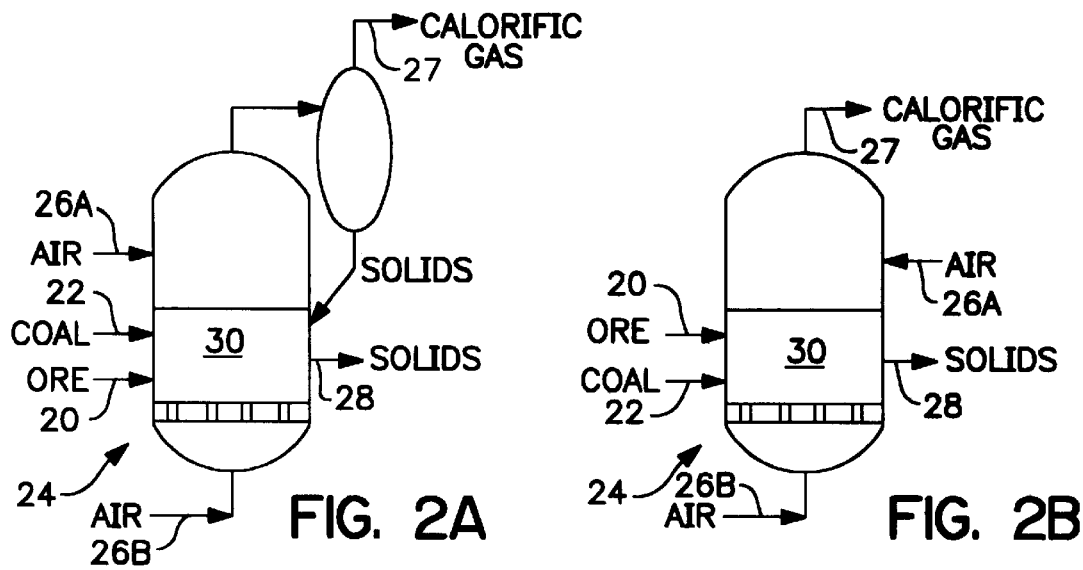
FIG. 2A
FIG. 2B
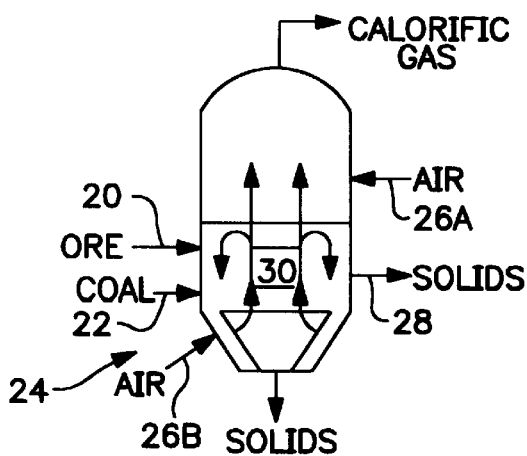
FIG. 2C

IRON ORE REFINING METHOD

BACKGROUND OF THE INVENTION

The present invention relates to a method of refining iron ore in which the iron ore is reduced to iron containing products. More particularly, the present invention relates to such a method in which char formed from a carbon containing substance, such as coal, is gasified in the reduction of the iron ore. Even more particularly, the present invention relates to such a method in which the char is formed and all or part of the iron ore to be refined is partly reduced within a secondary reactor and the resultant char and partly reduced iron ore are fed into a higher temperature primary reactor for production of the iron containing products.

There are various iron refining processes that include the use of electric arc, open hearth, blast furnaces, the COREX® Process, and primary bath smelting reactors such as are used in the ROMELT process. In all of such reactors, a charge of iron ore and a carbon containing substance such as coal or coke is introduced into a reactor. Oxygen or oxygen enriched air is also introduced into the reactor to gasify the carbon containing material to produce a reducing gas containing hydrogen and carbon monoxide. The reducing gas acts to reduce the ore, thereby to produce an iron containing substance such as a mixture of steel or iron and a separate slag phase.

In the COREX® process, iron ore and flux are introduced into a shaft furnace to reduce the iron to the solid metal and calcine the flux with a reducing gas produced in the melter-gasifier. Coal or coal that is preheated by combustion of the coal volatiles, known as hot char, is introduced into a melter gasifier along with the directly reduced iron and flux from the shaft furnace and oxygen. The char is gasified and the ore from the shaft furnace is further reduced and melted to produce a molten mixture of iron and slag that can be withdrawn as a product stream. In a primary bath smelting reactor, such as used in the ROMELT process, oxygen, iron ore and coal are introduced into a reactor to produce iron and slag products.

In any of the above-mentioned processes it is desired to maximize the productivity of the reactor. Further, all of the above-mentioned processes use processed oxygen, namely oxygen having a purity of about 95% or greater or oxygen enriched air. Such processed oxygen contributes to the cost of production. Thus, a reduction in required processed oxygen usage allows either reduced production costs or more productivity with no increase in cost, at least with respect to oxygen usage. As will be discussed, the present invention provides a method that can be used in connection with any of the above-mentioned processes that allows for an increase in reactor productivity accompanied by a reduction in the usage of processed oxygen.

SUMMARY OF THE INVENTION

The present invention relates to an iron refining method in which an iron ore feed, a carbon containing substance, and an oxygen containing gas are fed a secondary reactor to produce products. The products comprise a calorific gas comprising of carbon dioxide and carbon monoxide in a ratio of no less than about 0.25 and heated solids containing char and partly reduced iron ore. In this regard, the term, "partly reduced iron ore" as used herein and in the claims means a mixture of some ferric oxides, predominately ferrous oxides, and some metallic iron produced from the iron ore (predominately ferric oxides) by reduction. The term "calorific gas", as used herein in the claims means a gas predominately containing water, carbon monoxide, carbon dioxide, and some hydrogen and hydrocarbons. At least about 90% of the calorific gas is separated from the products produced within the secondary reactor to form an intermediate feed. The intermediate feed is introduced into a primary reactor without substantial cooling of the hot solids and the partly reduced iron ore is further reduced within the primary reactor to form at least part of an iron containing liquid product. The secondary reactor operates at a temperature less than that of the primary reactor.

It is to be recognized that since the present invention has application to a process such as the COREX® process, it is contemplated that the iron product is formed from iron ore and flux feeds that are split between the shaft furnace and the secondary reactor. In such a case, the resultant intermediate feed from the secondary reactor to the primary reactor only forms part of the iron containing product. In a primary bath smelting reactor all of the partly reduced iron ore to be processed would normally be supplied from the secondary reactor. A further point to be mentioned here is the term "substantial cooling", as used herein and in the claims, means cooling beyond 200° C. from the temperature of the secondary reactor or within 200° C. of ambient temperature.

The productivity and thermal efficiency the primary reactor is limited by its heat transfer rate and efficiency. The secondary reactor increases the capacity of the primary reactor by decreasing the total energy requirement to reduce the ore and melt the flux and reduced ore to produce the molten metal and slag phase products. The secondary reactor also increases the thermal efficiency of the primary process by removing the coal volatiles and partially reducing the iron ore feed at a lower temperature within the confines of a reasonable carbon dioxide and carbon monoxide ratio. Because of this, air or at the very least oxygen enriched air at a lower oxygen enrichment than that required in the primary reactor, can be used at the oxidant within the secondary reactor and as such will decrease the requirement for processed oxygen.

BRIEF DESCRIPTION OF THE DRAWINGS

While the specification concludes with claims distinctly pointing out the subject matter that applicant regards as his invention, it is believed the invention will be better understood when taken in connection with the accompanying drawings in which:

FIG. 1 is a schematic view of an apparatus for carrying out a method in accordance with the present invention; and FIGS. 2a, 2b and 2c are alternative embodiments of a secondary reactor used in the apparatus shown in FIG. 1.

DETAILED DESCRIPTION

With reference to FIG. 1, the primary reactor 10 is provided which can be an open hearth furnace which could have separate inputs in the form of thermal energy. Other possibilities would be the tuyere area melting zone of a blast furnace, the melter-gasifier of the COREX® process or a primary bath smelting process such as a ROMELT primary bath reactor. In this regard, the term "melter-gasifier" is any reactor in which partly reduced or substantially reduced iron is reduced and melted to form a liquid metallic iron rich phase in the presence of coal coke or char which is undergoing gasification. The "tuyere area of a blast furnace", as that term is used herein and in the claims would be a species of a melter-gasifier. Lastly a "bath-type smelting reactor", as used herein and in the claims, is any reactor in which iron ore, a carbon source and oxygen are added to a liquid melt."

For exemplary purposes the present invention will be described by reference to a primary bath smelting reactor in which ore, coal, and flux are fed as a feed 12 is fed into primary reactor 10. Oxygen-enriched air or even high purity oxygen as a feed 14 is also introduced into primary reactor 10 to produce an off gas stream 16 and an iron ore and slag products stream 18. Iron ore and optionally flux (calcium carbonate) as a feed 20 (which would constitute part of the total feed of iron ore to be refined and fluxed) and a coal feed 22 are fed into a secondary reactor 24. The coal is party oxidized by air which is introduced as an air feed 26 to form char. The volatile content of the coal is preferentially decreased. Thus, the ore can be partially reduced, the flux calcined, and the coal preheated with minimum loss of fixed carbon in the original coal feed, which is a very desirable feedstock for the primary reactor. The iron ore introduced into secondary reactor 10 is partly reduced by the coal char and calorific gas produced by the partial oxidation of coal so that a hot and partially reduced solid ore is produced.

The reaction is conducted within secondary reactor 24 such that the calorific gas contains carbon dioxide and carbon monoxide in a ratio of no less than 0.25. The calorific gas is separated from the heated solids comprising in the main, partly reduced iron ore, calcined flux and char, and is thereafter discharged from secondary reactor 24 as a calorific gas stream 27. As will be discussed, such separation is effectuated by a fluidized bed reactor and should separate greater than about 90% of the calorific gas from the heated solids. The heated solids and any part of the calorific gas not separated from the heated solids are fed into primary reactor 10 as an intermediate feed 28. In primary reactor 10, the hot char gasifies and thus produces heat to melt the ore and flux and a reducing gas containing primarily hydrogen, carbon monoxide and much smaller quantities of carbon dioxide and water products. Carbon monoxide and hydrogen reduce the partially oxidized iron as well as the iron ore that has not yet been reduced. The heat of reaction melts the resultant iron and slag which is removed as an iron ore and slag product stream 18.

The secondary ore contained within feed 20 is preferably in a size range of between about 100 and about 5,000 microns in diameter. Relatively large coal particles are the preferred coal feed 22 and are preferably in a size range of between about 1 and about 50 millimeters in diameter. The use of such coal eliminates the need for expensive coal grinding facilities.

The air feed 26 can be contacted with a coal and iron ore by a variety of methods. As such, secondary reactor 20, as illustrated in FIG. 2A, can be an external recirculating flow reactor, a fluidized solid bed as shown in FIG. 2B or an internal circulating fluidized bed as shown in FIG. 2C. Alternatively, the air feed 26 can be advantageously fed as two subsidiary streams 26A and 26B above and below a expanded solids bed 30 formed within each of the reactor types illustrated in FIGS. 2A, 2B, and 2C. Carbon monoxide in the calorific gas from the ore, flux, and coal char bed and will react with the oxygen supplied by subsidiary stream 26A to produce a more oxidized secondary reactor calorific and increase thermal efficiency of secondary reactor 20. The resultant heat will be transferred to expanded solids bed 30 primarily by conduction to the walls of the secondary reactor and radiation from the walls of secondary reactor 24.

As stated previously, the ratio of carbon dioxide to carbon monoxide within the calorific gas produced within secondary reactor 24 should be no less than about 0.25. The purpose behind such ratio is to strike a balance between thermal efficiency and the need to reduce iron ore. The separate oxygen feeds substantially increase the optimum carbon dioxide to carbon monoxide ratio. Put another way, the more carbon dioxide, the more thermally efficient but the less production of carbon monoxide to accomplish the reduction of iron and vice-versa. The ratio can be controlled by suitably adjusting air and coal feed ratio and gas-solid contacting time. Thus, bed height becomes important because it will influence gas-solid contacting time. The higher the bed, the higher the mass transfer efficiency between gas and solids. Higher mass transfer efficiencies decrease the carbon dioxide concentration which is advantageous from an ore reduction efficiency viewpoint. However, high bed heights are not advantageous from a process heat balance standpoint. A balance between these factors will dictate the bed height from between about 1 and about 5 meters with a bed height to vessel diameter ratios generally between about 0.2 and 5. The bed height to vessel diameter ratio is much less important than the absolute value of the bed height.

Secondary reactor 24 should operate at a pressure that is roughly equal to or greater than the operating pressure of the primary reactor and the means used to transport solids. In case intermediate feed 28 is accomplished by a short solids transfer line or a mechanical device such as a hot screw feeder or star valve, the pressure within the two reactors would be about the same. In case of gas transport, the pressure within secondary reactor 24 would have to be set higher than primary reactor 10 to compensate for pressure losses in piping between the reactors. In any type of transport used, it is important that solids be fed into primary reactor 10 without appreciable heat loss from their origination within secondary reactor 24 or in other words, suffer a temperature loss during transport between reactors of more than about 200° C. The operating temperature of the secondary reactor 24 must be greater than the autothermal ignition temperature of coal but less than the sintering temperature of any feed component. Thus, the temperature range of secondary reactor operation is preferably in a range of between about 400° C. and about 1200° C. A preferred temperature range is between about 700° C. and about 950° C. The operational temperatures of secondary reactor 24 should be compared to the temperature at which primary reactor 10 would operate which would be in a range of between about 1500° C. and about 1800° C. The lower temperature of the secondary reactor allows air to be used for secondary reactor 26 and can substantially reduce the requirements for processed oxygen.

While the present invention has been described with reference to a preferred embodiment, as will occur to those skilled in the art, numerous additions, omissions and changes may be made without departing from the spirit and scope of the present invention.

I claim:

1. An iron refining method comprising:
   feeding an iron ore feed, a carbon containing substance, and an oxygen containing gas in a secondary reactor to produce products comprising a calorific gas comprising carbon dioxide and carbon monoxide in a ratio no less than 0.25 and hot solids containing char and partly reduced iron ore;
   separating at least about 90% of the calorific gas from the products produced within said secondary reactor to form an intermediate feed;
   introducing said intermediate feed into a primary reactor without substantial cooling of said hot solids; and
   reducing said partly reduced iron ore within said primary reactor to form at least part of an iron containing product;

the secondary reactor operating at a temperature less than that of said primary reactor.

2. The iron refining method of claim 1, wherein said iron ore feed and said carbon containing substance form a bed within said secondary reactor and an oxygen containing gas is fed to said secondary reactor at locations thereof above and below said bed to allow the carbon monoxide to react with oxygen at a heat of reaction transferred to said bed.

3. The iron refining method of claim 1, wherein said temperature is within a temperature range of between about 400° C. and 1200° C.

4. The iron refining method of claim 1, wherein said temperature is within a temperature range of between about 700° C. and 950° C.

5. The iron refining method of claim 1, wherein said iron ore feed comprises fine iron ore in an iron ore size range of between about 100 and about 5000 microns and said carbon containing substance comprises granular coal in a coal size range of between about 1 and about 50 mm.

6. The iron refining method of claim 1 wherein said secondary reactor is a fluidized bed reactor, an internal circulating fluidized bed reactor, or a circulating flow reactor.

7. The iron refining method of claim 3 wherein said secondary reactor is a fluidized bed reactor, an internal circulating fluidized bed reactor, or a circulating flow reactor.

8. The iron refining method of claim 1, wherein said primary reactor is a melter-gasifier.

9. The iron refining method of claim 7, wherein said primary reactor is a melter-gasifier.

10. The iron refining method of claim 1, further comprising feeding flux into the secondary reactor.

\* \* \* \* \*